(12) United States Patent
Kim et al.

(10) Patent No.: US 7,744,440 B2
(45) Date of Patent: Jun. 29, 2010

(54) METHOD OF GROWING CARBON NANOTUBES AND METHOD OF MANUFACTURING FIELD EMISSION DEVICE USING THE SAME

(75) Inventors: Ha-Jin Kim, Suwon-si (KR); Sang-Mock Lee, Yongin-si (KR)

(73) Assignee: Samsung SDI Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1035 days.

(21) Appl. No.: 11/476,654

(22) Filed: Jun. 29, 2006

(65) Prior Publication Data

US 2010/0009474 A1 Jan. 14, 2010

(30) Foreign Application Priority Data

Dec. 13, 2005 (KR) ...................... 10-2005-0122425

(51) Int. Cl.
*H01J 9/00* (2006.01)
(52) U.S. Cl. .......................... 445/50; 445/23
(58) Field of Classification Search ............. 445/23–25, 445/49–51; 313/504–506
See application file for complete search history.

(56) References Cited

FOREIGN PATENT DOCUMENTS

KR 2001-0029762 4/2001
KR 10-2004-0084773 10/2004

OTHER PUBLICATIONS

U.S. Appl. No. 11/476,653, filed Jun. 29, 2006, Ha-Jin Kim et al.
Korean Office Action corresponding to Korean Patent Application No. 10-2005-0122425, issued on Dec. 7, 2006.

*Primary Examiner*—Joseph L Williams
(74) *Attorney, Agent, or Firm*—Robert E. Bushnell, Esq.

(57) ABSTRACT

A method of growing carbon nanotubes and a method of manufacturing a field emission device using the same is provided. The method of growing carbon nanotubes includes steps of preparing a substrate, forming a catalyst metal layer on the substrate to promote growing of carbon nanotubes, forming an inactivation layer on the catalyst metal layer to reduce the activity of the catalyst metal layer, and growing carbon nanotubes on a surface of the catalyst metal layer. Because the inactivation layer partially covers the catalyst metal layer, carbon nanotubes are grown on a portion of the catalyst metal layer that is not covered by the inactivation layer. Thus, density of the carbon nanotubes can be controlled. This method for growing carbon nanotubes can be used to make an emitter of a field emission device. The field emission device having carbon nanotube emitter made of this method has superior electron emission characteristics.

18 Claims, 8 Drawing Sheets

METHOD OF GROWING CARBON NANOTUBES AND METHOD OF MANUFACTURING FIELD EMISSION DEVICE USING THE SAME

CLAIM OF PRIORITY

This application makes reference to, incorporates the same herein, and claims all benefits accruing under 35 U.S.C. §119 from an application for METHOD FOR GROWING CARBON NANOTUBES AND MANUFACTURING METHOD OF FIELD EMISSION DEVICE THEREWITH, earlier filed in the Korean Intellectual Property Office on Dec. 13, 2005 and there duly assigned Serial No. 10-2005-0122425.

BACKGROUND OF THE INVENTION

1. Field of the Invention

The present invention relates to a method of growing carbon nanotubes and a method of manufacturing a field emission device using the same, and more particularly, to a method of growing carbon nanotubes having a suitable density for making an emitter of a field emission device, and a method of manufacturing a field emission device using the carbon nanotubes by which the field emission device is constructed to have superior electron emission characteristics.

2. Description of the Related Art

Carbon nanotubes have drawn attention as an electron emission source such as an emitter of a field emission device. Methods of forming carbon nanotubes include thermal chemical vapor deposition (CVD), arc discharge, laser ablation, plasma enhanced chemical vapor deposition (PECVD), etc.

In the thermal CVD method, a catalyst metal layer is formed on an electrode formed on a substrate, and carbon nanotubes are vertically grown from the surface of a catalyst metal layer by injecting a carbon containing gas such as methane ($CH_4$), acetylene ($C_2H_2$), ethylene ($C_2H_4$), ethane ($C_2H_6$), carbon monoxide (CO), or carbon dioxide ($CO_2$) together with hydrogen ($H_2$) gas, nitrogen ($N_2$) gas, or argon (Ar) gas into a reactor, which is maintained at a temperature of 500° C. to 900° C. In the PECVD, carbon nanotubes are grown in the similar process of the CVD method.

SUMMARY OF THE INVENTION

The present invention provides a method of growing carbon nanotubes, by which the density of the carbon nanotubes can be controlled. The present invention also provides a method of manufacturing a field emission device that has a superior electron emission characteristic by controlling the density of carbon nanotubes of an emitter, thereby reducing a driving voltage and increasing a field emission current.

According to an aspect of the present invention, there is provided a method of growing carbon nanotubes. The method includes steps of preparing a substrate, forming a catalyst metal layer on the substrate to promote growing of the carbon nanotubes, forming an inactivation layer on the catalyst metal layer to reduce the activity of the catalyst metal layer, and growing the carbon nanotubes on a surface of the catalyst metal layer. The inactivation layer may include a plurality of inactivation lumps, and each of the inactivation lumps is separated with a predetermined gap from another of the inactivation lumps. The carbon nanotubes may be grown on a portion of the surface of the catalyst metal layer that is not covered by the inactivation lumps.

According to another aspect of the present invention, there is provided a method of manufacturing a field emission device. The method includes steps of preparing a panel that includes a substrate, a negative electrode formed on the substrate, a silicon layer formed on the negative electrode, a gate electrode insulating layer formed on the silicon layer, and a gate electrode formed on the gate electrode insulating layer, forming a well through the gate electrode and the gate electrode insulating layer to expose the silicon layer, forming a catalyst metal layer on the silicon layer to promote the growing of the carbon nanotubes, forming an inactivation layer on the catalyst metal layer to reduce the activity of the catalyst metal layer, and forming a carbon nanotube emitter by growing the carbon nanotubes from a surface of the catalyst metal layer. The inactivation layer may include a plurality of inactivation lumps, and each of the inactivation lumps is separated with a predetermined gap from another of the inactivation lumps. The carbon nanotubes are grown on a portion of the surface of the catalyst metal layer that is not covered by the inactivation layer.

The inactivation layer may be formed of a material containing fullerene. The fullerene may be fullerene C60. The inactivation layer may be formed by an electron beam evaporation method. The carbon nanotubes may be formed using a thermal CVD method or a PECVD method. The catalyst metal layer may be formed of a material such as nickel, iron, cobalt, platinum, molybdenum, tungsten, yttrium, gold, palladium, and alloys of these materials. The catalyst metal layer may be formed by a magnetron sputtering method or an electron beam evaporation method.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE INVENTION

The present invention will now be described more completely with reference to the accompanying drawings in which exemplary embodiments of the invention are shown.

Figure 1A:
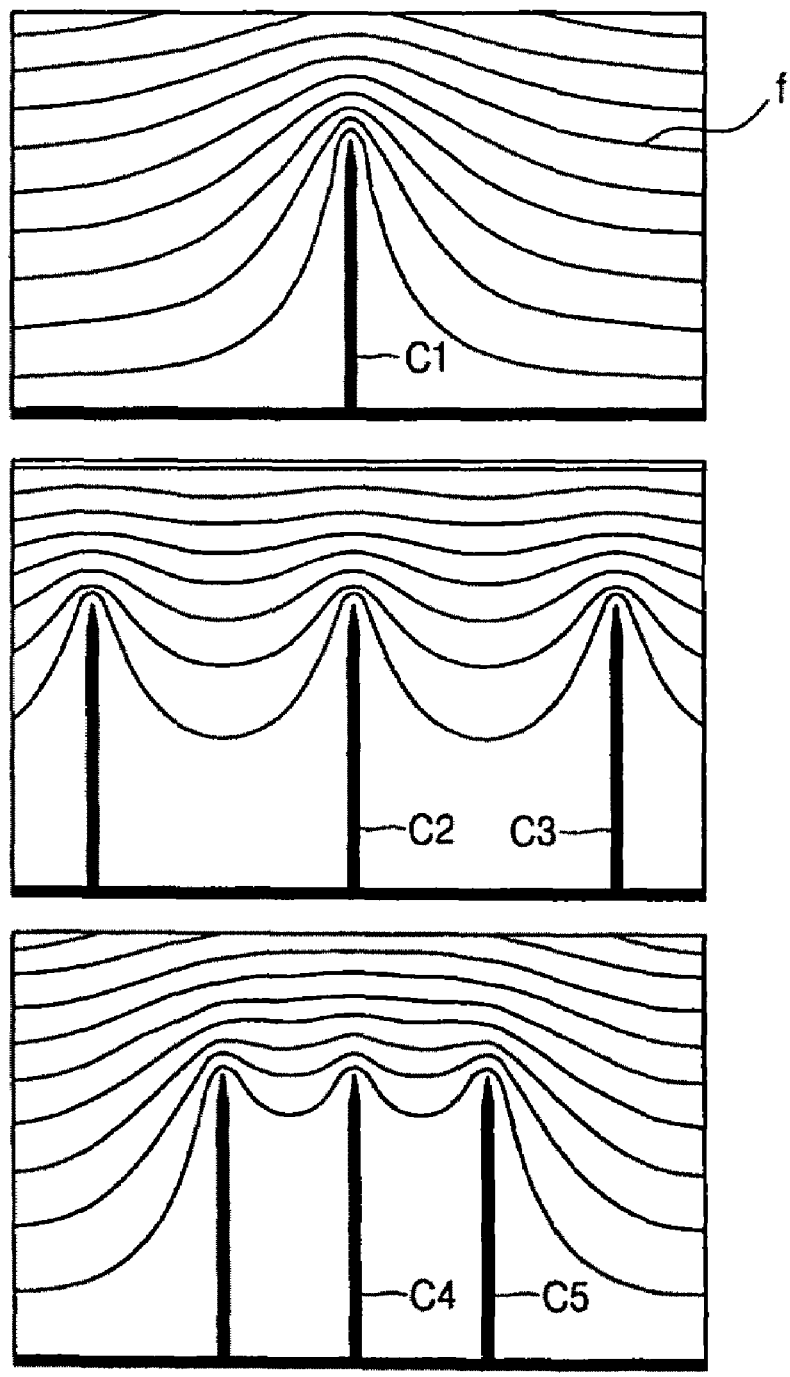
FIGS. 1A through 1C show the relationship between a field emission characteristics and a density of carbon nanotubes as an electron emission source of a field emission device.
Figure 1B:
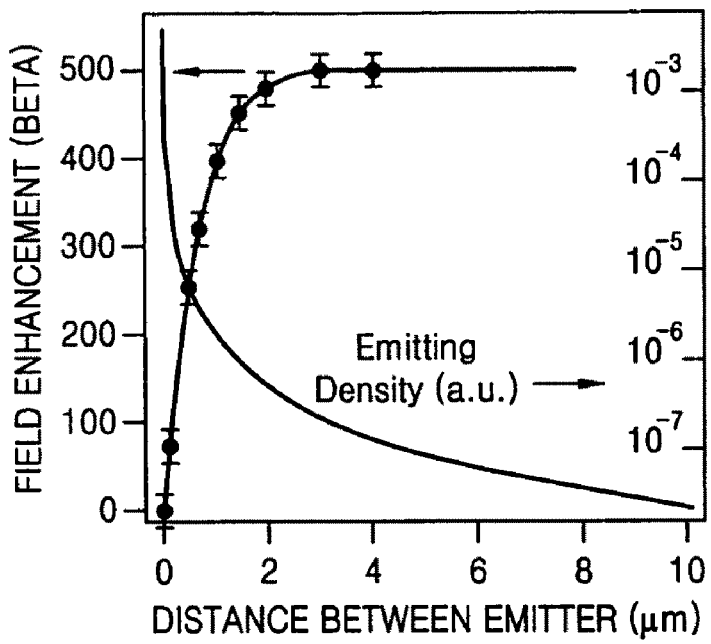
Figure 1C:
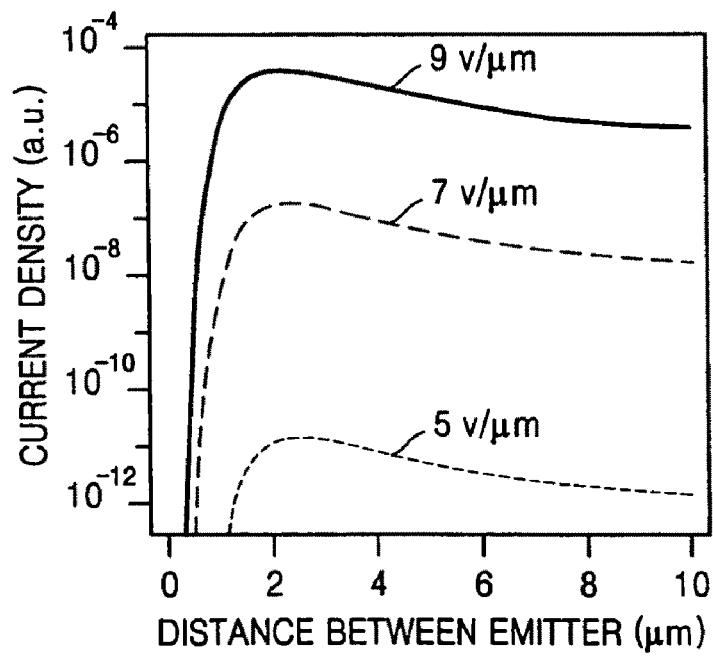

FIGS. 1A through 1C show the relationship between field emission characteristics and the density of carbon nanotubes as an electron emission source of a field emission device. FIG. 1A shows simulation results of penetration of field as a function of a gap between carbon nanotubes. Lines f in FIG. 1A are equi-potential lines, and elements C1 through C5 are carbon nanotubes. As shown in FIG. 1A, if a gap between carbon nanotubes is small, fields cannot penetrate the space between the carbon nanotubes, but remain around the upper ends of the carbon nanotubes in a screened shape. This effect is called a screening effect, and once the screening effect is generated, field enhancement of a field emission device decreases. FIGS. 1B and 1C are graphs showing field enhancement and a current density, respectively, as a function of a gap between carbon nanotubes. As depicted in FIGS. 1B and 1C, if the gap between carbon nanotubes decreases less than about 2 μm, the field enhancement is dramatically reduced, and also the current density is rapidly reduced. Accordingly, in order to use carbon nanotubes as an electron emission source of a field emission device, a method of growing carbon nanotubes that is able to provide an appropriate low density of carbon nanotubes to increase a field emission characteristic, and a method of controlling the density of the carbon nanotubes are required.

Figure 2A:
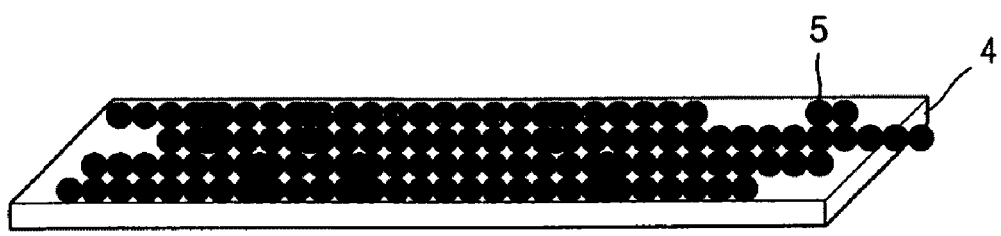
FIG. 2A is a schematic drawing showing a distribution of lumps of an inactivation layer made of metals or oxides.

FIG. 2A is a schematic drawing showing inactivation layer 5 formed on catalyst metal layer 4. Inactivation layer 5 is formed to partially cover catalyst metal layer 4 to impede the activity of catalyst metal layer 4 that promotes growth of carbon nanotubes. In other words, Inactivation layer 5 reduces the activity of catalyst metal layer 4. Inactivation layer 5 shown in FIG. 2A is made of metals or oxides. Inactivation layer 5 includes distributed inactivation lumps formed on the catalyst metal layer 4. The inactivation lumps are closely packed with narrow gaps between the inactivation lumps, and the inactivation lumps grow into an agglomeration. If the surface of catalyst metal layer 4 is excessively covered by the inactivation lumps, the density of the carbon nanotubes becomes excessively low when carbon nanotubes are grown on catalyst metal layer 4.

Figure 2B:
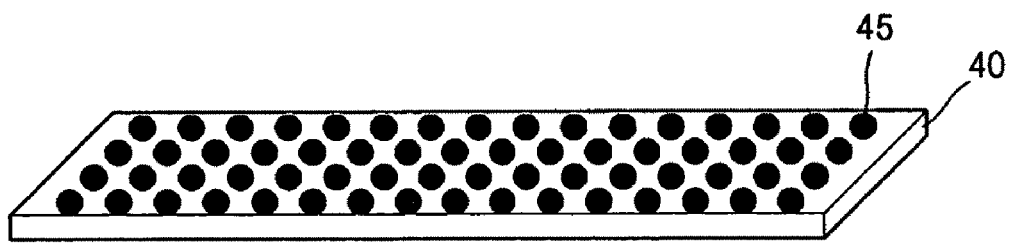
FIG. 2B is a schematic drawing showing a distribution of a inactivation layer made of fullerene.

FIG. 2B is a schematic drawing showing inactivation layer 45 formed of fullerene on catalyst metal layer 40. Inactivation layer 45 is formed in a form of lumps that are distributed on catalyst metal layer 40 as shown in FIG. 2B. However, the lumps have a wider gap than the lumps shown in FIG. 2A, and are arranged regularly with a constant gap without being agglomerated. For reference, fullerene is composed of non-polarized molecules. Therefore, force acting between the fullerene molecules is only Van der Waals force, which indicates that the molecules can hardly maintain a crystal state, because attraction force between the molecules is very weak, and thus, it is difficult to obtain a large fullerene crystal. Also, fullerene molecules included in a crystal behave as if they are far away from each other, because attraction force from neighboring fullerene molecules is very weak.

Figure 3A:
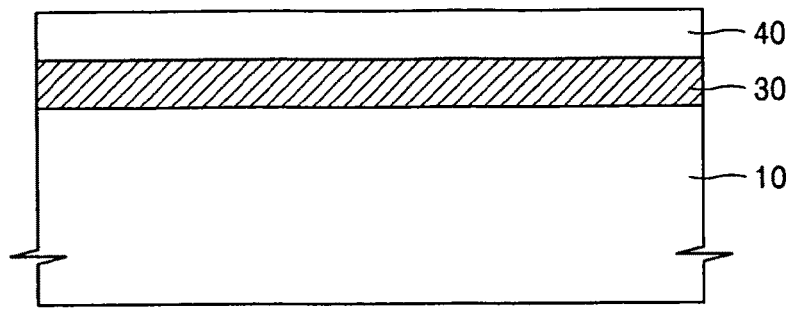
FIGS. 3A through 3C are cross-sectional views illustrating a method of growing carbon nanotubes according to principles of an embodiment of the present invention.
Figure 3B:
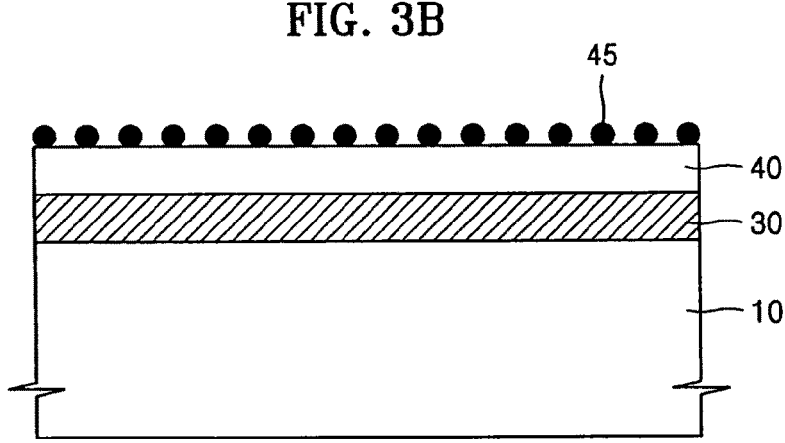
Figure 3C:
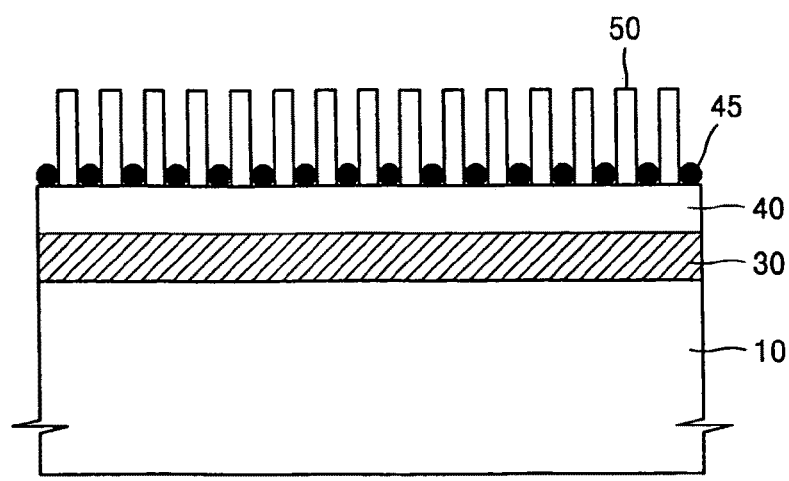
Figure 4:
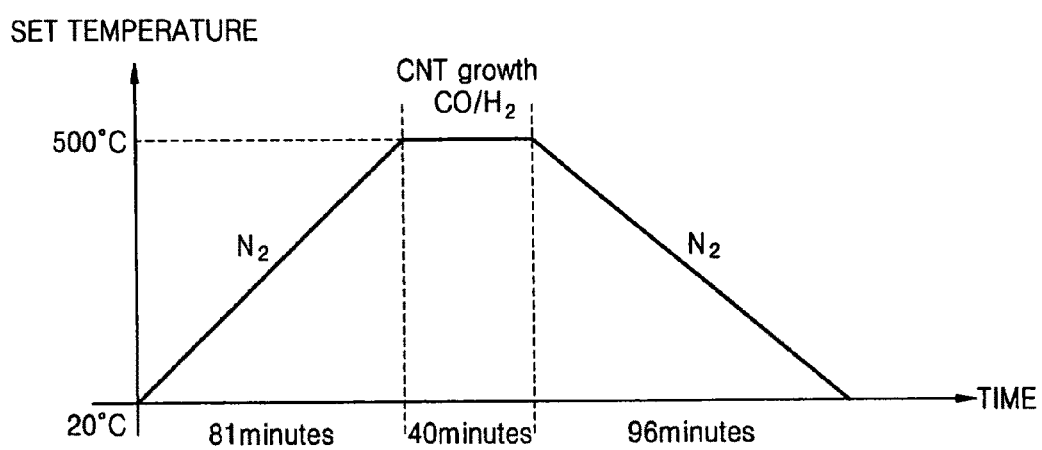
FIG. 4 is a graph showing a reaction condition of a chemical vapor deposition (CVD) method according to the principles of the present invention.

FIGS. 3A through 3C are cross-sectional views for illustrating a method of growing carbon nanotubes according to the principle of an embodiment of the present invention, and FIG. 4 is a graph showing a reaction condition of a chemical vapor deposition (CVD) method according to the principle of the embodiment of the present invention.

Referring to FIG. 3A, silicon layer 30 is formed on an upper surface of substrate 10, and catalyst metal layer 40 is formed on silicon layer 30. Substrate 10 may be formed of glass, but the material of the substrate in the present invention is not limited to glass. Substrate 10 can be formed of any material that is not deformed during the CVD process. Silicon layer 30 can be formed of amorphous silicon, crystalline silicon, or other form of silicon. However, in some cases, silicon layer 30 may not be necessary. In this case, catalyst metal layer 40 is directly formed on substrate 10.

Catalyst metal layer 40 can be formed by depositing a metal such as nickel (Ni), iron (Fe), cobalt (Co), platinum (Pt), molybdenum (Mo), tungsten (W), yttrium (Y), gold (Au), palladium (Pd), or alloys of these materials on a surface of silicon layer 30 or substrate 10. Catalyst metal layer 40 makes carbon nanotubes grow vertically on a surface of catalyst metal layer 40. Catalyst metal layer 40 may be formed by a magnetron sputtering method or an electron beam evaporation method.

After catalyst metal layer 40 is formed on silicon layer 30 or substrate 10, as depicted in FIG. 3B, inactivation layer 45 is formed on catalyst metal layer 40. Inactivation layer 45 may be formed of a material containing fullerene. This is because fullerene lumps that constitute inactivation layer 45 can be regularly distributed on catalyst metal layer 40 without being agglomerated. Inactivation layer 45 may be formed of fullerene C60, but the material for the inactivation layer in the present invention is not limited to fullerene C60. Various fullerenes such as fullerene C70, fullerene C80, etc., or derivatives of the fullerenes can be used in the present invention. Inactivation layer 45 may be formed by electron beam evaporation. In the present embodiment, inactivation layer 45 is formed of fullerene C60. The fullerene C60 is deposited on catalyst metal layer 40 in a thermal evaporator at a temperature greater than about 450° C. under a vacuum condition (pressure of about $1 \times 10^{-7}$ Torr).

After inactivation layer 45 is formed on catalyst metal layer 40, as depicted in FIG. 3C, carbon nanotubes 50 are grown on catalyst metal layer 40 using a CVD method. Carbon nanotubes 50 may be grown using a thermal CVD method. However, the carbon nanotube growing method in the present invention is not limited to the thermal CVD method. Various methods such as a PECVD method can be used for growing carbon nanotubes from a portion of a surface of a catalyst metal layer that is not covered by the inactivation layer.

In the present embodiment, a thermal CVD method is used for growing carbon nanotubes, and the carbon nanotube growing process is performed in a reactor maintained at a constant temperature under an atmosphere of gas mixture. The gas mixture includes carbon monoxide (CO) gas and hydrogen ($H_2$) gas mixed at predetermined composition ratio. More specifically, as depicted in FIG. 4, the carbon nanotube growing process is performed at a temperature of approximately 500° C. for about 40 minutes. At this time, the composition ratio of carbon monoxide gas/hydrogen gas ($CO/H_2$) is maintained at 1:2 to 3:2, and the pressure is maintained at 200 Torr. However, the condition for growing carbon nanotubes in the present invention is not limited to this condition suggested in the embodiment. The carbon nanotube growing process may be non-isothermally performed, and the ratio of carbon monoxide gas/hydrogen gas ($CO/H_2$) may vary. Carbon nanotubes 50 may be formed by injecting a gas containing carbon such as methane ($CH_4$), acetylene ($C_2H_2$), ethylene ($C_2H_4$), ethane ($C_2H_6$), carbon monoxide (CO), or carbon dioxide ($CO_2$) together with one of hydrogen ($H_2$) gas, nitrogen ($N_2$) gas, or argon (Ar) gas into a reactor. In the present embodiment, a process for increasing the temperature of reactor to 500° C., which is a carbon nanotube growing temperature, is performed for 81 minutes under an atmosphere of nitrogen ($N_2$) gas, and the temperature decreasing to a room temperature is performed for 96 minutes under the atmosphere of nitrogen ($N_2$) gas.

Carbon nanotubes 50 are formed on the surface of catalyst metal layer 40 by the carbon nanotube growing process described above. Inactivation layer 45 formed on catalyst metal layer 40 in this method has lumps regularly distributed on catalyst metal layer 40. The lumps of inactivation layer 45 maintains predetermined gaps from each other. Accordingly, as depicted in FIG. 3C, carbon nanotubes 50 are vertically grown on a portion of the surface of catalyst metal layer 40, where the portion of the surface of catalyst metal layer 40 are not covered by inactivation layer 45. That is, carbon nanotubes 50 are not grown on the surfaces of inactivation layer 45, but grown on the surfaces of catalyst metal layer 40. Accordingly, carbon nanotubes 50 can be distributed in various gaps on catalyst metal layer 40 depending on the degree of inactivation driven by inactivation layer 45 partially covering catalyst metal layer 40. The area of the activated surface of the catalyst metal layer 40 can be reduced by partially covering catalyst metal layer 40 with inactivation layer 45, and thus, the density of carbon nanotubes 50 grown on catalyst metal layer 40 decreases.

As described above, the carbon nanotube growing process may be performed under an isothermal condition, and a process of increasing the temperature to a carbon nanotube growing temperature from room temperature and a process of decreasing the temperature to the room temperature from the carbon nanotube growing temperature may be performed under an atmosphere of nitrogen ($N_2$) gas. However, the condition for growing carbon nano tubes in the present invention is not limited to this condition suggested in the present embodiment. The process of raising and decreasing temperature before and after the growing carbon nanotubes 50, respectively, can be performed under an atmosphere of other inert gas such as helium (He) gas.

Because the method of growing carbon nanotubes 50 described above is not limited to the formation of an emitter for a field emission device, carbon nanotube growing conditions, such as the types and thicknesses of catalyst metal layer 40 and inactivation layer 45, can vary depending on the applications of the carbon nanotubes.

A method of manufacturing a field emission device constructed according to an embodiment of the present invention will now be described. FIGS. 5A through 5D are cross-sectional views illustrating a method of manufacturing a field emission device according to the principle of an embodiment of the present invention.

Figure 5A:
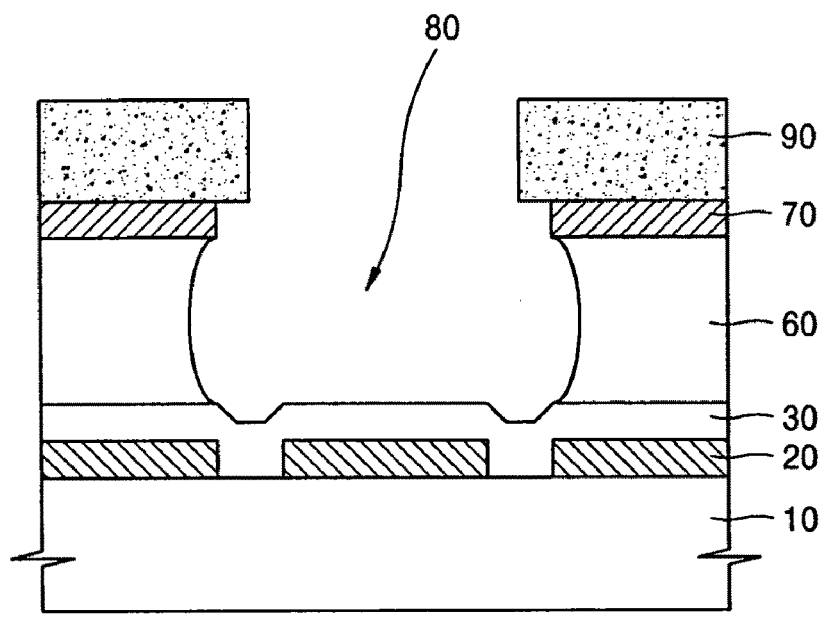
FIGS. 5A through 5D are cross-sectional views for illustrating a method of manufacturing a field emission device according to principles of an embodiment of the present invention.

FIG. 5A shows a structure of a panel. The panel includes negative electrode 20, silicon layer 30, gate electrode insulating layer 60, gate electrode 70, and photoresist layer 90 which are formed on an upper surface of substrate 10. For example, after patterning a molybdenum (Mo) or chromium (Cr) electrode on the upper surface of glass substrate 10, amorphous silicon (Si) layer 30 covering the patterned electrode may be formed. However, silicon layer 30 may not be formed if the silicon layer is not required.

Gate electrode insulating layer 60 is formed on silicon layer 30 using an insulating material such as silicon dioxide ($SiO_2$), and gate electrode 70 patterns are made after depositing a metal such as chromium (Cr) on gate electrode insulating layer 60. Well 80 is formed through gate electrode 70 and gate electrode insulating layer 60 in a predetermined position and silicon layer 30 or negative electrode 20, if silicon layer 30 is not formed, is exposed on the bottom of well 80.

Figure 5B:
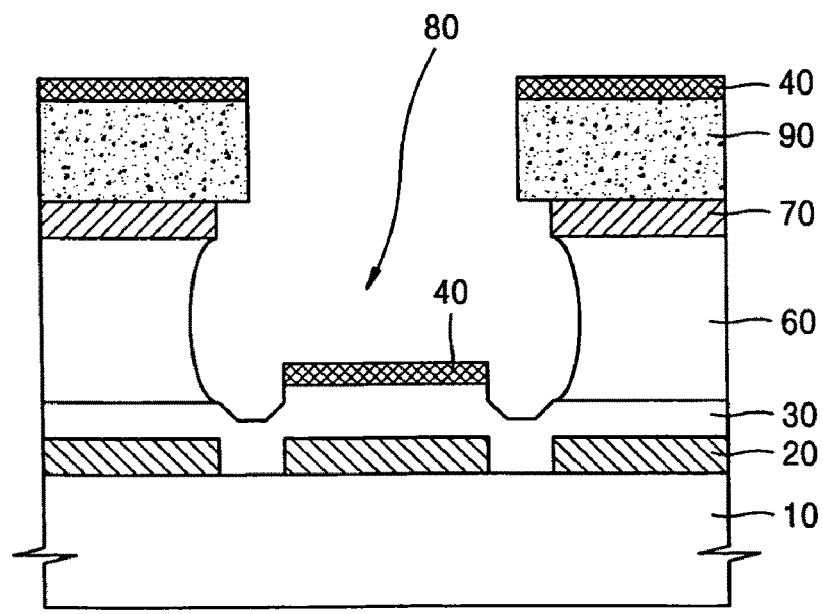

As depicted in FIG. 5B, catalyst metal layer 40 is deposited on the top of the panel made through the process described above. Catalyst metal layer 40 is deposited on silicon layer 30 or negative electrode 20 exposed on the bottom of well 80, and catalyst metal layer 40 is also deposited on photoresist layer 90 formed on gate electrode 70. As described above, catalyst metal layer 40 may be made of a material containing a nickel (Ni), iron (Fe), cobalt (Co), etc., or alloys of these metals. The deposition method of catalyst metal layer 40 can be a magnetron sputtering method or an electron beam deposition method.

Figure 5C:
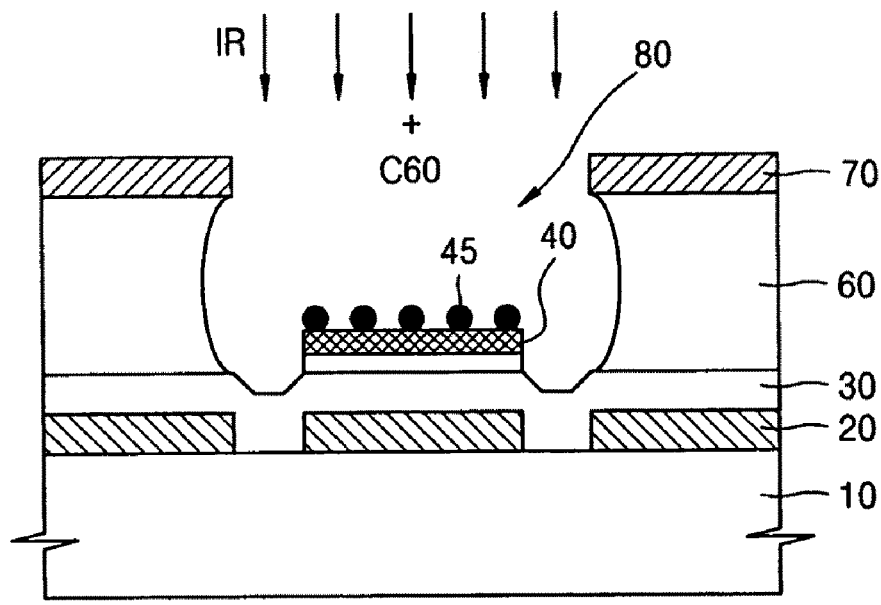

As depicted in FIG. 5C, inactivation layer 45 is formed on catalyst metal layer 40. Inactivation layer 45 can be formed by the electron beam evaporation method described above. During the process of forming inactivation layer 45, substrate 10 is maintained at a constant temperature of about 100° C.

To selectively deposit catalyst metal layer 40 and inactivation layer 45 on a surface of silicon layer 30 or negative electrode 20, a photoresist lift-off method may be used to remove photoresist layer 90 and catalyst metal layer formed on photoresist layer 90. Carbon nanotubes 50 are grown on a surface of catalyst metal layer 40 where inactivation layer 45 is partially formed. Carbon nanotubes 50 may be grown using the thermal CVD method described above.

Figure 5D:
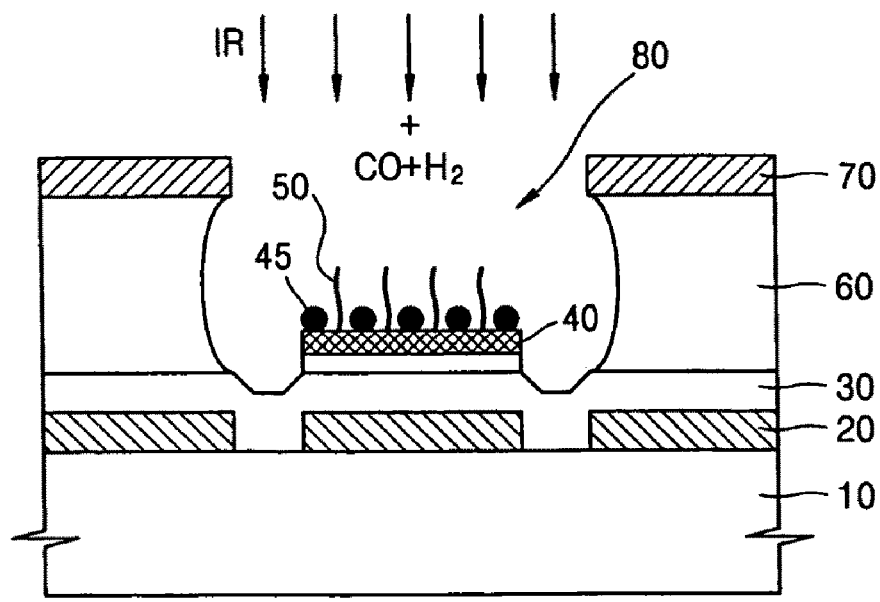

As depicted in FIG. 5D, carbon nanotubes 50 are grown from a portion of the surface of catalyst metal layer 40 that are not covered by inactivation layer 45. Therefore, carbon nanotubes 50 are distributed with predetermined gaps from each other. That is, carbon nanotubes 50 are formed with low density on the surface of catalyst metal layer 40. When carbon nanotubes 50 are used for an emitter of a field emission device, carbon nanotubes 50 can form a carbon nanotube emitter having superior field emission characteristics, because the field enhancement and current density of the emitter improve with the low density carbon nanotubes. Thus, the field emission device having the carbon nanotube emitter can have a low driving voltage and a high field emission current.

Figure 6A:
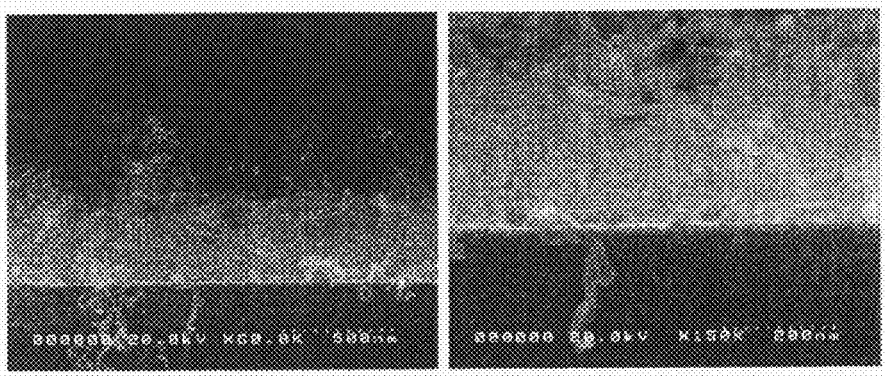
FIG. 6A shows scanning electron microscope (SEM) images of carbon nanotube emitters of a field emission device formed by a CVD method according to the principles of the present invention.
Figure 6B:
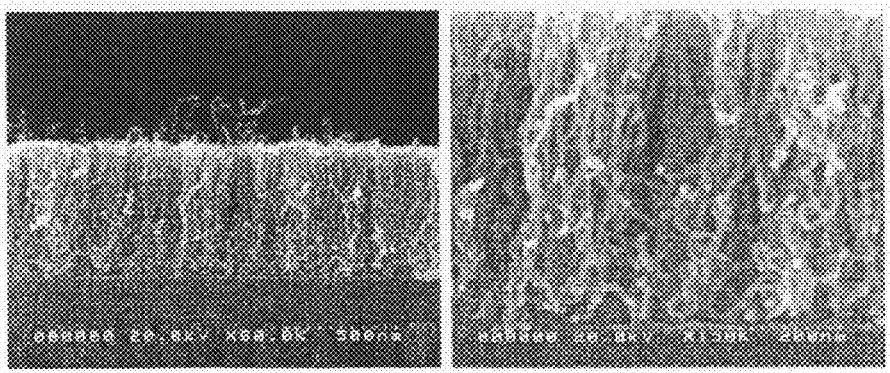
FIG. 6B shows SEM images of carbon nanotube emitters of a field emission device formed by a conventional CVD method as a comparative example.

FIG. 6A shows SEM images of carbon nanotube emitters of a field emission device formed by a CVD method according to the principles of the present invention, and FIG. 6B shows SEM images of carbon nanotube emitters of a field emission device formed by a conventional CVD method as a comparative example to FIG. 6A.

The SEM images in FIG. 6B show an example of carbon nanotubes grown without an inactivation layer, and the SEM images in FIG. 6A show carbon nanotubes grown with an inactivation layer. The carbon nanotubes shown in FIG. 6A are grown at temperature of 500° C. after an inactivation layer is formed on a substrate that is maintained at temperature of 100° C. during the carbon nanotube growing process.

As depicted in FIG. 6A, when the carbon nanotubes are grown on a catalyst metal layer after the inactivation layer is formed on the catalyst metal layer, the density of the carbon nanotubes is remarkably lower than that of the carbon nanotubes shown in FIG. 6B. That is, the carbon nanotubes shown in FIG. 6A have larger gaps therebetween. Also, the carbon nanotubes are irregularly arranged, because interacting force between neighboring carbon nanotubes is weakened as the density of the carbon nanotubes decreases.

The measured density of the carbon nanotubes in FIG. 6A is $1.47 \times 10^9$ ea/$cm^2$, and that of the carbon nanotubes in FIG. 6B is $1.23 \times 10^{11}$ ea/$cm^2$. That is, the carbon nanotubes grown by the method disclosed in the present invention have remarkably reduced density. The density of the carbon nanotubes can be reduced below $1.47 \times 10^9$ ea/cm$^2$ if necessary. Left SEM images in FIGS. 6A and 6B are taken at 60,000 times magnification, and right SEM images are taken at 150,000 times magnification.

According to the present invention, a method of growing carbon nanotubes that is able to control the density of the carbon nanotubes is provided. Also, the present invention provides a method of manufacturing a field emission device that has superior electron emission characteristics by controlling the density of a carbon nanotubes of the emitter, thereby reducing the driving voltage and increasing the field emission current.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of growing carbon nanotubes, comprising:
   preparing a substrate;
   forming a catalyst metal layer on the substrate, an activity of the catalyst layer promoting growing of carbon nanotubes;
   forming an inactivation layer on the catalyst metal layer to reduce the activity of the catalyst metal layer, the inactivation layer including a plurality of inactivation lumps, each of the inactivation lumps being separated with a predetermined gap from another of the inactivation lumps;
   growing carbon nanotubes from a surface of the catalyst metal layer.

2. The method of claim 1, comprised of the step of preparing the substrate including a step of forming a silicon layer on the substrate.

3. The method of claim 1, comprised of the inactivation layer being made of a material including a fullerene.

4. The method of claim 3, comprised of the fullerene including a fullerene C60.

5. The method of claim 1, comprised of the step of forming the inactivation layer including a process of electron beam evaporation.

6. The method of claim 1, wherein the carbon nanotubes are grown using a thermal chemical vapor deposition method or a plasma enhanced chemical vapor deposition method.

7. The method of claim 1, wherein the catalyst metal layer is formed of a material selected from the group consisting of nickel, iron, cobalt, platinum, molybdenum, tungsten, yttrium, gold, palladium, and alloys thereof.

8. The method of claim 1, wherein the catalyst metal layer is formed by a magnetron sputtering method or an electron beam evaporation method.

9. The method of claim 1, comprised of the carbon nanotubes being grown on a portion of the surface of the catalyst metal layer that is not covered by the inactivation lumps.

10. A method of manufacturing a field emission device, comprising:
    preparing a panel that includes a substrate, a negative electrode formed on the substrate, a gate electrode insulating layer formed on the negative electrode, and a gate electrode formed on the gate electrode insulating layer;
    forming a well through the gate electrode and the gate electrode insulating layer until the negative electrode is exposed at a bottom of the well;
    forming a catalyst metal layer on the negative electrode, an activity of the catalyst layer promoting growing of carbon nanotubes;
    forming an inactivation layer on the catalyst metal layer to reduce the activity of the catalyst metal layer, the inactivation layer including a plurality of inactivation lumps, each of the inactivation lumps being separated with a predetermined gap from another of the inactivation lumps; and
    forming a carbon nanotube emitter by growing carbon nanotubes from a surface of the catalyst metal layer.

11. The method of claim 10, comprised of the inactivation layer being made of a material including a fullerene.

12. The method of claim 11, comprised of the fullerene including a fullerene C60.

13. The method of claim 10, comprised of the step of forming the inactivation layer including a process of electron beam evaporation.

14. The method of claim 10, wherein the carbon nanotubes are grown using a thermal chemical vapor deposition method or a plasma enhanced chemical vapor deposition method.

15. The method of claim 10, wherein the catalyst metal layer is formed of a material selected from the group consisting of nickel, iron, cobalt, platinum, molybdenum, tungsten, yttrium, gold, palladium, and alloys thereof.

16. The method of claim 10, wherein the catalyst metal layer is formed by a magnetron sputtering method or an electron beam evaporation method.

17. The method of claim 10, comprised of the carbon nanotubes being grown on a portion of the surface of the catalyst metal layer that is not covered by the inactivation lumps.

18. A method of manufacturing a field emission device, comprising:
    preparing a panel that includes a substrate, a negative electrode formed on the substrate, a silicon layer formed on the negative electrode, a gate electrode insulating layer formed on the silicon layer, and a gate electrode formed on the gate electrode insulating layer;
    forming a well through the gate electrode and the gate electrode insulating layer until the silicon layer is exposed at a bottom of the well;
    forming a catalyst metal layer on the silicon layer, an activity of the catalyst layer promoting growing of carbon nanotubes;
    forming an inactivation layer on the catalyst metal layer to reduce the activity of the catalyst metal layer, the inactivation layer including a plurality of inactivation lumps, each of the inactivation lumps being separated with a predetermined gap from another of the inactivation lumps; and
    forming a carbon nanotube emitter by growing carbon nanotubes from a surface of the catalyst metal layer, the carbon nanotubes being grown on a portion of the surface of the catalyst metal layer that is not covered by the inactivation lumps.

* * * * *